Oct. 27, 1931.  C. CHILOWSKY  1,829,474
METHOD AND DEVICE FOR ESTABLISHING COMMUNICATION
BETWEEN AIRCRAFT IN FULL FLIGHT AND THE GROUND
Filed July 9, 1929
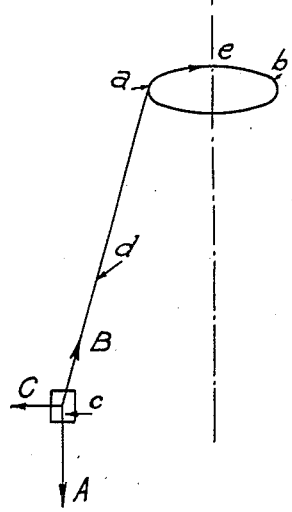
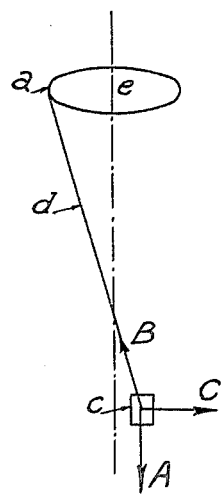
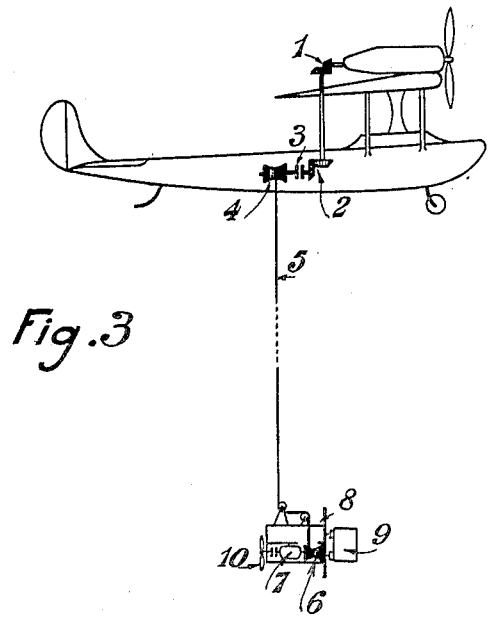
Inventor
Constantin Chilowsky
By
atty Patented Oct. 27, 1931

1,829,474

UNITED STATES PATENT OFFICE

CONSTANTIN CHILOWSKY, OF PARIS, FRANCE

METHOD AND DEVICE FOR ESTABLISHING COMMUNICATION BETWEEN AIRCRAFT IN FULL FLIGHT AND THE GROUND

Application filed July 9, 1929, Serial No. 377,023, and in France July 10, 1928.

It is well known that it is very difficult to establish a communication between an aircraft in full flight and the ground, by reason of the great speed of the aircraft. Now it is of great interest to be able to establish such a communication, even between a very small ground surface and an aircraft chiefly in the case where it is desired to provide food to or to save people in parts of difficult access.

My invention has for its object a method and a device for establishing such a communication. To this end, the aircraft carries a windlass to which is hung a comparatively considerable weight. This weight is lowered during flight by a length corresponding substantially to the distance separating the aircraft from the ground, when it is above the point with which it is desired to establish a communication. For operation the aircraft is caused to move in circles above said point. There are two positions of equilibrium of the weight with reference to the path followed by the aircraft. These positions are illustrated respectively on Figs. 1 and 2 of appended drawings.

On Fig. 1, the aircraft $a$ diagrammatically shown as a dot describes the circle $b$; the weight $c$, at the end of the cable $d$, is submitted to the action of gravity A, to that of the traction of the cable B and to that of the centrifugal force C. These forces equilibrate one another and obviously for this first or outer position, the weight $c$ describes a circle of large radius.

But as stated, it is possible to retain the weight in the second position of equilibrium shown in Fig. 2.

In this figure, the axis round which the aircraft rotates is shown at $e$. If the weight $c$ is in the position illustrated in Fig. 2, there may obviously still exist an equilibrium between the forces A, B and C acting on the weight $c$. For this position, the weight $c$ will describe round the axis $e$ a circle of very small radius, the existence of which has afforded me the means for solving the above mentioned problem. It should also be noted that in this latter case, the speed of weight $c$ is much smaller than that of the aircraft, the ratio of said speeds being equal to that of the radii of the circles described by the two bodies. Consequently, it is possible to provide a comparatively gentle contact between the weight $c$, the persons or objects secured to it and the ground.

Supposing P to be the weight secured to the cable, W the common angular speed of the aircraft and of the weight, M the mass of the hanging weight $(P=Mg)$, $h$ the difference in altitude between the aircraft and the weight suspended to it for their relative position of equilibrium, R the radius of the circle described by the aircraft, $r_e$ the radius of the circle described by the weight, the equation of equilibrium in the case where the weight and the aircraft are on the same side of the vertical passing through the center of the circle described by the aircraft is $$\frac{P}{Mr_e w^2} = \frac{h}{r_e - R}$$

or $$\frac{g}{r_e w^2} = \frac{h}{r_e - R}$$

or again $$r_e = \frac{Rg}{g - hw^2}$$

Supposing $r_i$ to be the radius of the inner circle described by the weight when the latter is on the other side of the above defined vertical with reference to the aircraft, a similar calculation gives $$r_i = \frac{Rg}{hw^2 - g}$$

Supposing the radius of the aircraft circle to be 100 m. and $g=9,81$ $w=0,4$ (for an aircraft speed of 40 meters per second) the value of $r_i$ will be respectively 158 m.; 14 m.; 6,5 m. for values of $h$ equal to 100 m.; 500 m. and 1000 m.

The linear speed $v$ of the weight with reference to the ground when coming into contact therewith will be in these three cases 63 m. per sec.; 5,6 m. per sec. and 2,6 m. per sec.

Thus, if no account is taken of the resistance of the air acting on the cable, it will be apparent that an aircraft moving at 150 km. per hour can lower through a cable of about 1000 m. long on to the ground a weight in a manner such that the linear speed of this weight, when reaching ground, is only 2,5 m./sec. so that the operation can be accomplished in a perfectly safe manner.

When the pilot is to lower the weight, he should, whilst making his circles, always see the weight hanging inside the circles. When changing from a linear motion to a circular motion the pilot should by suitably moving with reference to the moving weight, reduce its speed to the above given values or the like.

My invention has for its object, beyond the above described method, means for executing same.

A preferred embodiment of my invention will be described with reference to the appended drawings, in which:

Figs. 1 and 2 are theoretical views, already referred to, for explaining the principle of my invention.

Fig. 3 is a diagrammatic view of an embodiment of my invention.

The weight $c$ being rather considerable, the control of the windlass 4 for winding and unwinding the cable 5 $d$ will be provided by the motor of the aircraft through a suitable speed reducing gear 1. The windlass also comprises the usual braking, connecting and disconnecting devices 3. For large-sized aircrafts, a special motor may be used.

If the end of the cable is to lower persons on to the ground or to lift them off ground, means are provided for controlling instantaneously from the weight $c$ itself its vertical movements, for instance through the winding or unwinding of the cable 5.

In particular, the winding of the cable may be provided not only on the aircraft, but also on a windlass 6 carried by the weight $c$. The last mentioned windlass may be controlled by the persons travelling with the weight $c$ through a motor 7 carried by the said weight.

I may dispose on the weight $c$ static devices such as surfaces 8 taking advantage of the resistance of the air for braking purposes together with controlling rudders 9. I may even dispose on the weight $c$ dynamic devices such as propellers driven through motor 7 and the like for stopping almost instantaneously the weight when landing.

It is apparent that my method affords means for transporting goods or passengers from one point of the earth to another without requiring any landing of the transporting aircraft. It is sufficient that the aircraft and weight move in the respective paths shown on Fig. 2 at the loading and at the unloading station.

What I claim is:

1. Method for establishing a cable communication between an aircraft in the air and a limited area on the ground which consists in lowering a weighted cable from the aircraft and causing said aircraft to describe circles about a vertical axis passing through the center of said area, whereby the weighted end of the cable describes circles, at a limited speed, close above said area.

2. Method for landing passengers or goods from a flying aircraft in the air to the ground which consists in lowering said passengers or goods from the aircraft by means of a cable and causing the aircraft to describe circles above the landing point, whereby the passengers or goods at the end of the cable describe circles of small radius at a limited speed close above the ground, and can thus be safely transferred to the ground.

3. Method for embarking passengers or goods from the ground to an aircraft in the air which consists in lowering a weighted cable from the aircraft and causing said aircraft to describe circles above the landing point, whereby the weighted end of the cable describes circles of small radius at a limited speed close above the ground, securing the passengers or goods to said end of the cable and then hoisting them to the aircraft.

4. A device for transporting passengers or goods between the ground and an aircraft in the air comprising a cable, means on the aircraft for winding and unwinding said cable, a nacelle adapted to carry passengers or goods secured to the lower end of the cable, and means in said nacelle for controlling the winding and unwinding of the cable.

5. A device for transporting passengers and goods between the ground and an aircraft in the air comprising a cable, means on the aircraft for winding and unwinding said cable, a nacelle adapted to carry passengers or goods secured to the lower end of said cable, a windlass in said nacelle for winding and unwinding said cable, a motor in said nacelle for driving said windlass, and static means on said nacelle for braking its motion through the resistance of the air.

6. A device for transporting passengers or goods between the ground and an aircraft in the air comprising a cable, means on the aircraft for winding and unwinding said cable, a nacelle adapted to carry passengers or goods secured to the lower end of said cable, a windlass in said nacelle for winding and unwinding said cable, a motor in said nacelle for driving said windlass, static means on said nacelle for braking its motion through the resistance of the air, propellers on said nacelle for braking the motion thereof, and means for driving said propellers.

In testimony that I claim the foregoing as my invention, I have signed my name.

CONSTANTIN CHILOWSKY.